Figure 1:
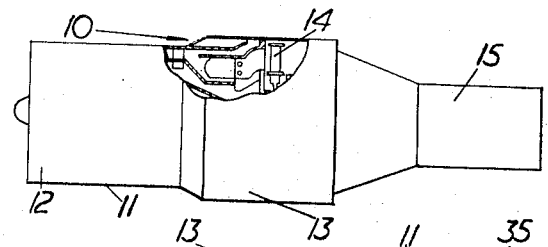

May 2, 1967 S. F. SMITH ETAL 3,316,714
GAS TURBINE ENGINE COMBUSTION EQUIPMENT
Filed May 28, 1964 4 Sheets-Sheet 1

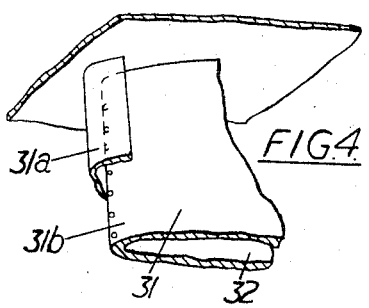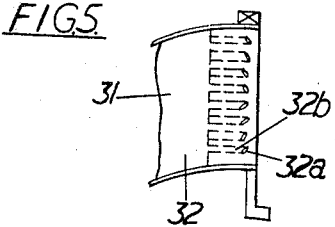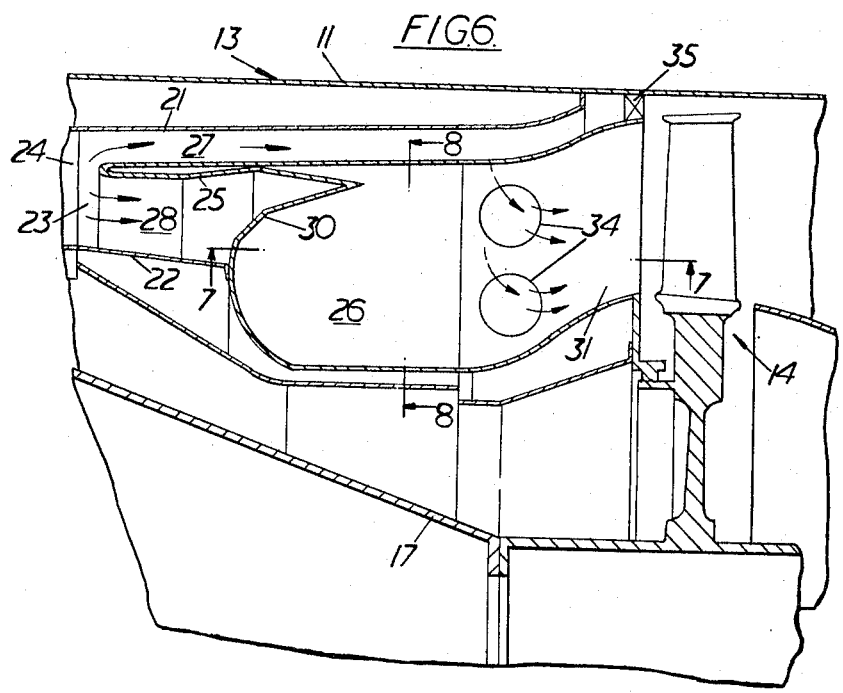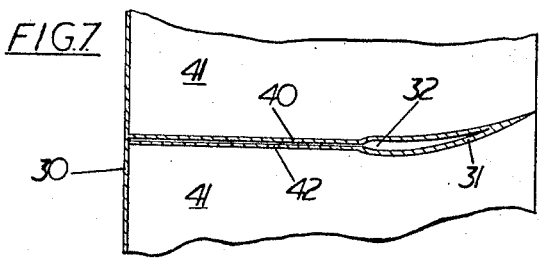

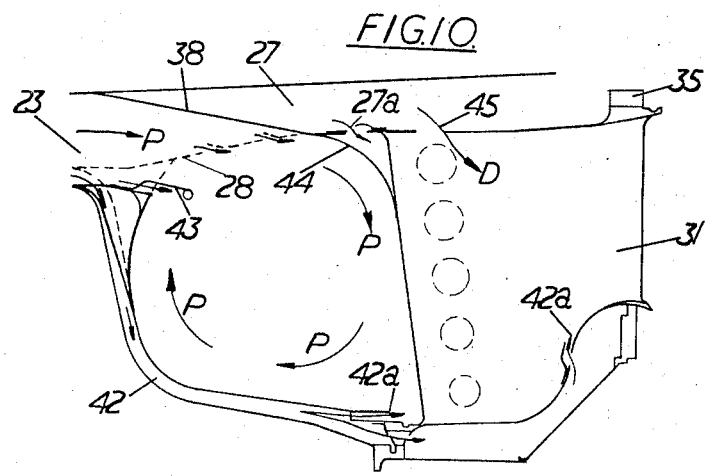
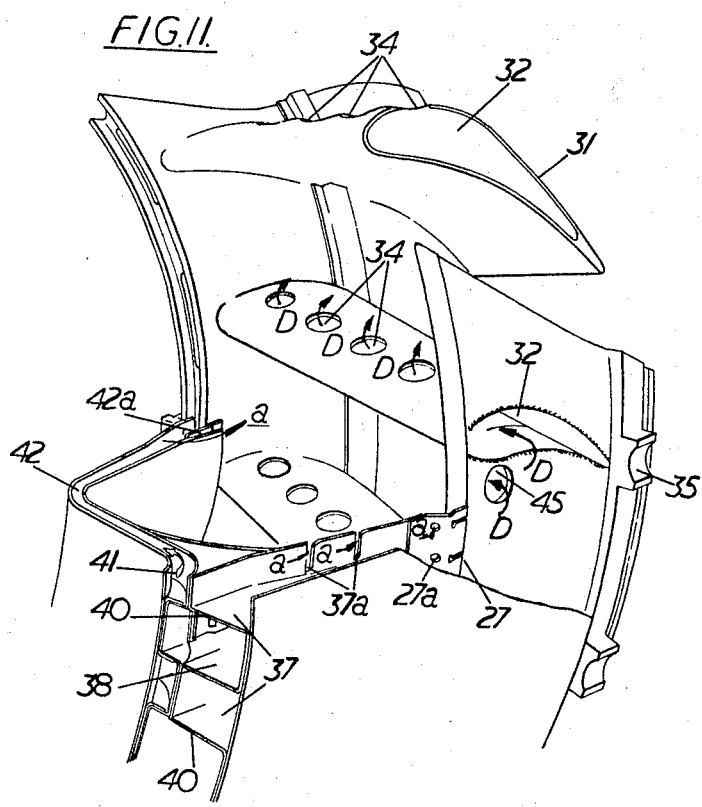

United States Patent Office 3,316,714
Patented May 2, 1967

3,316,714
GAS TURBINE ENGINE COMBUSTION
EQUIPMENT
Stanley Frank Smith, Duffield, and Paul Alfred Taylor, Derby, England, assignors to Rolls-Royce Limited, Derby, England, a company of Great Britain
Filed May 28, 1964, Ser. No. 370,938
Claims priority, application Great Britain, June 20, 1963, 24,673/63
8 Claims. (Cl. 60—39.65)

This invention relates to combustion equipment for a gas turbine engine.

According to the present invention, a gas turbine engine combustion chamber comprises an outer casing, a flame tube mounted within the outer casing and spaced therefrom, an axially extending dilution air duct, which is adapted to be supplied with dilution air, and which extends alongside the flame tube, an axially extending primary combustion air duct for delivering primary combustion air to the upstream end of the flame tube, and a plurality of angularly spaced apart nozzle guide vanes which are mounted within and extend radially completely across the flame tube, each nozzle guide vane having a passage therein communicating with the dilution air duct, and the wall of each nozzle guide vane having at least one aperture therein which communicates with the said passage and which is disposed within the flame tube and is spaced from the downstream end thereof, the arrangement being such that dilution air from the dilution air duct passes through said apertures in a downstream direction to mix with the combustion gases flowing through the flame tube.

The provision of nozzle guide vanes integral with the combustion chamber results in a saving in overall engine length as compared with gas turbine engines of the commonly used type in which the nozzle guide vanes are mounted external to the combustion chamber, and downstream thereof.

According to a preferred feature of this invention, each nozzle guide vane has a aerofoil section and the aperture or apertures is or are provided on the low pressure side of the nozzle guide vane.

Preferably, each nozzle guide vane is further provided with at least one aperture on the high pressure side thereof.

According to one embodiment of the invention, each nozzle guide vane extends axially substantially throughout the downstream half of the flame tube.

According to an alternative embodiment of the invention, a single annular flame tube is provided and the nozzle guide vanes extend the full length of the flame tube and define therein a plurality of combustion compartments.

According to another preferred feature of the invention, the primary combustion and dilution air ducts are supplied with air through primary and dilution air chutes respectively, the entrances to the said primary and dilution air chutes being alternately juxtaposed around an annular air passage.

A flow directing surface may be provided in the flame tube downstream of the entrance thereto of the primary combustion air duct. The surface having a curvative such that at least part of the primary combustion air entering the flame tube is directed into a circulatory flow in the upstream portion of the flame tube. The flame tube is preferably provided at its upstream end, at the entrance thereto of each primary combustion air duct, with a fuel atomising member, disposed in relation to the flow directing surface so that the circulating air flow produced thereby impinges on the said member.

Figure 2:
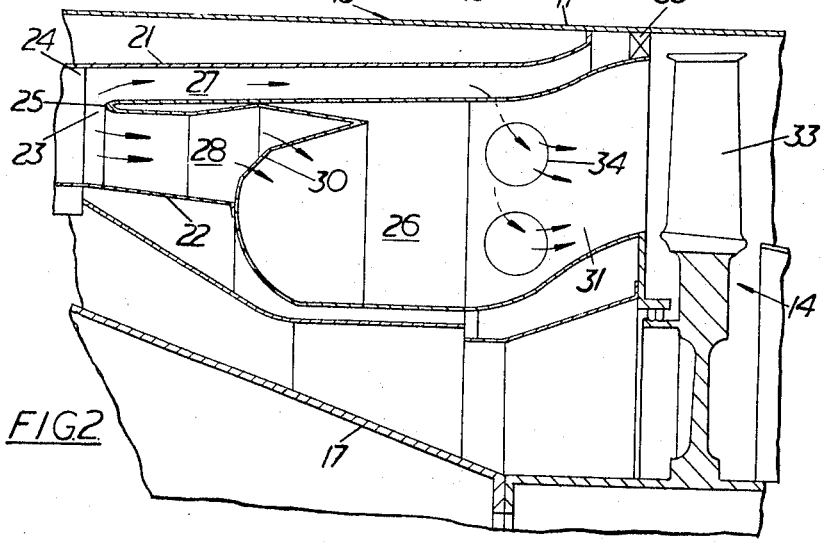
Figure 3:
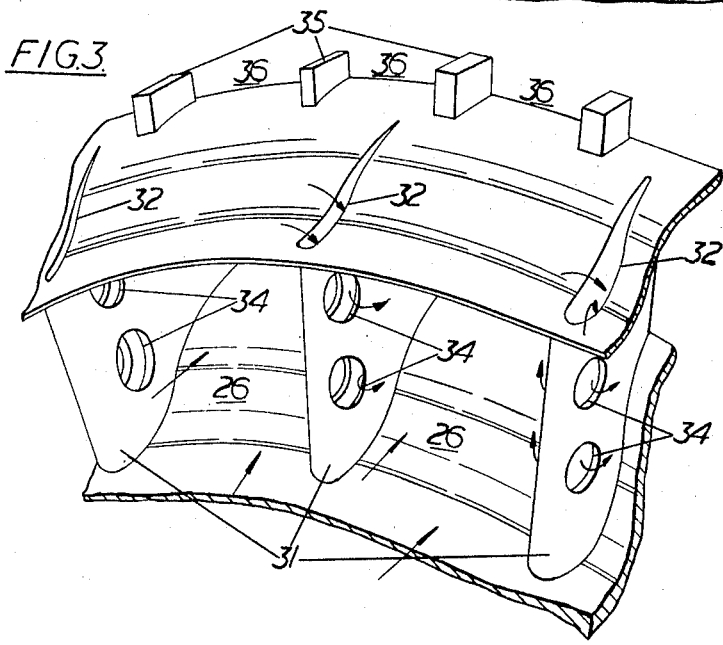
Figure 8:
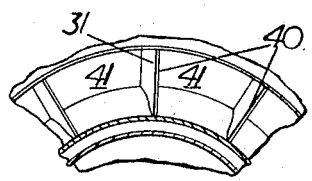
Figure 9:
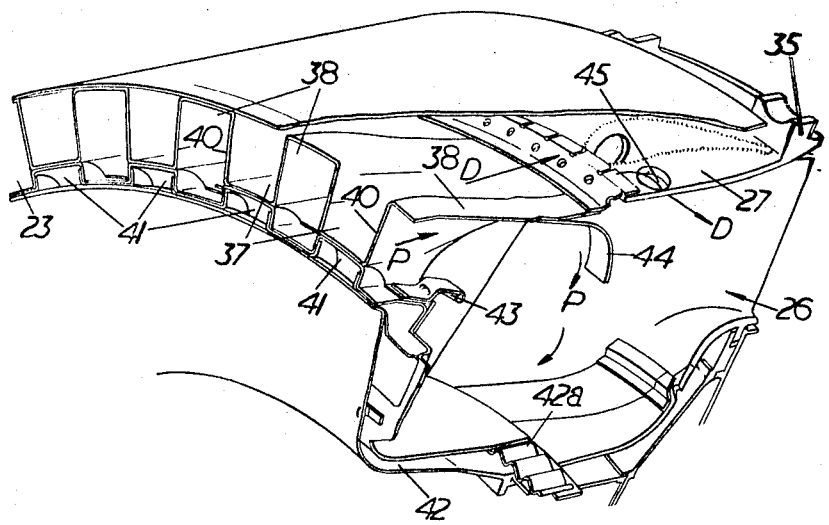

The invention is illustrated, merely by way of example, in the accompanying drawings, in which:

FIGURE 1 is a side view of a gas turbine engine incorporating the invention, showing part of the engine casing cut away, FIGURE 2 is a radial section of part of the combustion chamber of the gas turbine engine shown in FIGURE 1, showing one embodiment of the invention, FIGURE 3 is a perspective view of part of a turbine nozzle guide vane assembly employed in the embodiment shown in FIGURE 2, FIGURE 4 is a cut away view showing part of a nozzle guide vane in the region of its leading edge, FIGURE 5 is a side view of part of a nozzle guide vane in the region of its trailing edge, FIGURE 6 is a radial section of part of a gas turbine engine according to another embodiment of the invention, FIGURE 7 is an axial section taken along the line 7—7 in FIGURE 6, FIGURE 8 is a reduced cross sectional view taken along the line 8—8 in FIGURE 6, FIGURE 9 is a partly cut away perspective view of a combustion chamber according to a further embodiment of the invention, FIGURE 10 is a radial section of the combustion chamber shown in FIGURE 9, and FIGURE 11 is a cut away perspective view showing the structural detail of the combustion chamber of FIGURE 10.

Referring to FIGURE 1, there is shown a gas turbine engine 10. The engine 10 has an engine casing 11, within which are mounted in flow series a compressor 12, combustion equipment 13, a turbine 14 and an exhaust duct 15. The compressor 12 and the turbine 14 are mounted on a common shaft 17.

At the upstream end of the combustion equipment 13, outer and inner wall members 21 and 22 respectively define between them an annular inlet passage 23 adapted to receive air from the compressor 12. A ring of angularly spaced apart compressor outlet guide vanes 24 are mounted in the annular passage 23 to straighten the air flow emerging from the compressor 12.

Mounted in the annular inlet passage 23, downstream of the outlet guide vanes 24, is an axially extending intermediate wall member 25 which forms an extension of one wall of an annular flame tube 26. The intermediate wall member 25 divides the annular inlet passage 23 into an axially extending dilution air duct 27 and an axially extending primary combustion air duct 28, the dilution air duct 27 being defined between the outer wall member 21 and the intermediate wall member 25 and being disposed externally of the flame tube 26. The primary combustion air duct 28 leads into the flame tube 26 by way of a perforated wall member 30 which forms the upstream end of the flame tube 26.

Fuel is injected (by means not shown) into the flame tube 26 at its upstream end, and burnt in the primary combustion air entering the flame tube 26 from the primary combustion air duct 28. The dilution air duct 27 assists in thermally insulating the flame tube 26 from the outer wall member 21.

Extending substantially throughout the downstream half of the annular flame tube 26 are a number of angularly spaced apart turbine inlet nozzle guide vanes 31 each of which extends completely radially across the flame tube 26. Each nozzle guide vane 31 is hollow, having an internal radially extending passage 32 (see FIG. 3) which communicates with the dilution air duct 27. Each nozzle guide vane 31 has an aerofoil section in order to guide the hot combustion gases on to the turbine blades 33 of the turbine 14 at the desired angle of incidence.

Each of the opposite walls of each nozzle guide vane 31, is provided, adjacent the leading edge, with two dilution air holes 34 which communicate with the internal passage 32. Obviously, a larger number of dilution air holes 34 could be provided.

Air from the dilution air duct 27 enters the flame tube 26 by way of the passages 32 and the dilution air holes 34 so as to pass therethrough in a downstream direction and to mix with the combustion gases flowing through the flame tube, whereby the temperature of the combustion gases is lowered prior to their entry into the turbine 14. The high gas flow over the surfaces of the nozzle guide vanes 31 results in the dilution air from the dilution air duct 27 being drawn through the dilution air holes 34 by a venturi effect. This effect is most marked for those dilution air holes 34 situated in the outwardly convex walls of the nozzle guide vanes 31, that is, on the low pressure side of the vanes 31. The venturi effect produces a pressure drop across the dilution air holes 34, typical values of the ratio of the pressure inside to the pressure outside the holes 34 being 1.2 for the holes on the low pressure side of the nozzle guide vanes 31 and 1.1 for the holes on the high pressure (i.e. outwardly concave) side of the vanes 31.

The high pressure drop produced across the dilution air holes 34 located on the low pressure side of the nozzle guide vanes 31 enables a given degree of mixing of the combustion gases with the dilution air to be achieved with smaller holes than would otherwise be necessary. The use of small diameter dilution air holes 34 is an advantage as it allows the mixing process to be controlled simply by regulating the number of dilution air holes 34 provided.

Although a greater degree of mixing results with the dilution air holes 34 on the low pressure side of the nozzle guide vanes 31, the high pressure drop across these holes tends to cause high pressure losses in the mixing process. Also, aerodynamic considerations make it preferable to provide dilution air holes 34 on the high pressure side of the nozzle guide vanes 31, since the steady acceleration of the air flow over the nozzle guide vanes 31 on this side makes separation of the flow due to the presence of the air holes 34 less likely than when the air holes 34 are on the low-pressure side of the nozzle guide vanes 31.

The conflicting requirements for optimum mixing on the one hand and laminar flow conditions on the other hand lead to the compromise arrangement as illustrated in which dilution air holes 34 are provided on both the high and low presure sides of the nozzle guide vanes 31. The nozzle guide vanes 31 can be designed so as to give some acceleration of the air flow even on the low pressure side of the guide vane, in the region of its leading edge, in order to make this compromise arrangement more effective. With this arrangement, complete mixing of the dilution air with the combustion gases is achieved within about half the distance which would be required for complete mixing if dilution air holes 34 were provided on one side only of the nozzle guide vanes 31.

Referring to FIGURES 2 and 3, the annular flame tube 26 is located centrally with respect to the outer casing 11 by means of a number of spaced apart lugs 35 attached to the outer wall of the flame tube 26 at its downstream end, and extending radially to the outer casing 11.

By drawing dilution air through the passages 32 in the nozzle guide vanes 31, a high mass flow of air for cooling the nozzle guide vanes 31 is produced. This is an important consideration in engines operating with high flame temperatures, in which the temperature at the upstream end of the nozzle guide vanes 31 may exceed 2000° K. To assist in protecting the leading edges of the nozzle guide vanes 31 from the high temperature gases, a heat shield 31a, can be provided around the leading edge of each nozzle guide vane 31, as shown in FIGURE 4. To assist in cooling the inner surface of the heat shield 31a a number of small holes 3b can be provided in the leading edge o fthe nozzle guide vane 31, each hole 31b opening into the internal pasage 32. Dilution air escaping through the holes 31b also serves to cool the surface of the nozzle guide vane 31 near the upstream end thereof.

Referring to FIGURE 5, each nozzle guide vane 31 can be provided with a number of small holes 32a in the surfaces adjacent the trailing edge of the nozzle guide vane 31, the holes 32a communicating with the internal pasage 32 by way of passages 32b. Dilution air from the passage 32 is drawn through the holes 32a and serves to cool both the trailing edge of the nozzle guide vane 31 and the turbine blades 33.

An alternative embodiment of the present invention is shown in FIGURE 6, in which the structure is basically the same as that of FIGURE 2, and the same reference numerals are used to denote like parts.

In the FIGURE 6 embodiment, however, the leading edge of each inlet guide vane 31 is provided with a forwardly extending partition 40 extending upstream to the wall member 30 and thereby dividing the annular flame tube 26 into a number of separate combustion compartments 41 (see FIG. 8). Each partition 40 is hollow, having an internal space 42 which communicates with the combustion air duct 28 at its upstream end and with the internal pasage 32 at its downstream end, so that a stream of cooling air flows through space 42 to cool the partition 40.

In FIGURES 9–11 there is shown an alternative embodiment of the invention which is generally similar to the embodiments of FIGURES 2 and 6 and which, for this reason, will not be described in detail, like reference numerals indicating like parts.

In the embodiment of FIGURES 9–11, the hollow inlet guide vanes 31 are provided with dilution air holes 34 on their low pressure surfaces only, and the inlet guide vanes 31 extend throughout substantially the downstream half of the flame tube 26.

Primary combustion and dilution air are supplied from the annular passage 23 which receives air from the compressor of the engine (not shown) through primary combustion and dilution air ducts 28 and 27, respectively, as in the previously described embodiments.

The primary combustion and dilution air ducts 28, 27 are supplied with compressed air from the annular passage 23 through primary and dilution air chutes 38, 37 respectively, which are arranged alternately around the annular passage 23. Adjacent chutes 37, 38 are separated by radial walls 40 which are equi-angularly spaced around the annular passage 23. The entrance to each dilution air chute 37 is of smaller radial extent than the entrance to each primary air chute 38, the remainder of the space between alternate primary air chutes 38 being taken up by cooling air chutes 41.

Each cooling air chute 41 supplies air to a cooling air passage 42 surrounding the wall of the flame tube 26 which is remote from the dilution air passage 27 (i.e. the radially inner wall as illustrated). The walls of the flame tube 26 are provided with small cooling air holes 27a, 37a and 42a communicating with the dilution air duct 27, the dilution air chute 37 and the cooling air passage 42 respectively. Air flow through the holes 27a, 37a and 42a indicated by arrows a (FIGURE 11), provides a layer of relatively cool air along the walls of the flame tube 26.

A fuel atomising member 43 is provided at the upstream end of the flame tube 26 at the entrance thereto of each primary combustion air duct 28. Immediately downstream of the said entrance a curved flow-directing member 44 is provided the curvature of the member 44 being such that primary combustion air entering the flame tube 26 through the duct 28 is deflected to flow in a circulatory path in the upstream portion of the flame tube 26. The circulatory flow induced by the member 44 impinges on the fuel atomising member 43, assisting in the atomisation of fuel sprayed onto the member 43 by a fuel injection device located in the vicinity of the member 43 but omitted from the drawings since it forms no part of the present invention.

Dilution air, in addition to being supplied to the flame tube 26 through the dilution air holes 34 in the nozzle guide vanes 31, also enters the flame tube 26 through apertures 45 provided in the wall of the flame tube 26 angularly between each pair of nozzle guide vanes 31 and communicating directly with the dilution air duct 27.

In FIGURES 9–11, the flow of primary combustion air is indicated generally by arrows P, and the flow of dilution air is indicated generally by arrows D.

The incorporation of a nozzle guide vane assembly within the flame tube 26 of a combustion chamber results in a reduction in the overall engine length compared with engines in which the nozzle guide vanes are mounted conventionally downstream of the flame tube, a typical reduction in length being of the order of 4 inches. This feature is obviously an advantage when applied to, for example, vertical lift gas turbine engines, that is, engines which are mounted vertically in, for example, the wings of an aircraft.

It will be appreciated that the invention herein described has the further advantage that the deflection of the combustion gases by the nozzle guide vanes 31 occurs at a low dynamic pressure head compared with conventional arrangements in which the nozzle guide vanes are mounted externally of the flame tube, and this tends to reduce pressure losses.

We claim:

1. A gas turbine engine combustion chamber comprising an outer casing, a flame tube mounted within the outer casing and spaced therefrom and having a downstream and an upstream end in use thereof, an axially extending dilution air duct which is adapted to be supplied with dilution air, and which extends alongside the flame tube, an axially extending primary combustion air duct for delivering primary combustion air to the upstream end of the flame tube, a plurality of angularly spaced apart nozzle guide vanes having aerofoil surfaces which are mounted within and extend radially completely across the flame tube, a passage within each nozzle guide vane, each said passage communicating with the dilution air duct, and at least one aperture in a said aerofoil surface of each nozzle guide vane, said at least one aperture communicating with the said passage and with the interior of the flame tube upstream of the downstream end thereof, said apertures being such that at least a major part of the dilution air passes through said apertures to mix with the combustion gases flowing through the flame tube.

2. A gas turbine engine combustion chamber comprising an outer casing, a flame tube mounted within the outer casing and spaced therefrom and having a downstream and an upstream end in use thereof, an axially extending dilution air duct which is adapted to be supplied with dilution air and which extends alongside the flame tube, an axially extending primary combustion air duct for delivering primary combustion air to the upstream end of the flame tube, a plurality of angularly spaced apart nozzle guide vanes which are mounted within and extend radially completely across the flame tube, each nozzle guide vane having an aerofoil section with a low pressure surface, a passage within each nozzle guide vane, each said passage communicating with the dilution air duct, and at least one aperture in the said low pressure surface of each nozzle guide vane, said at least one aperture communicating with the said passage and with the interior of the flame tube upstream of the downstream end thereof, said apertures being such that at least a major part of the dilution air passes through said apertures to mix with the combustion gases flowing through the flame tube.

3. A gas turbine engine combustion chamber comprising an outer casing, a single annular flame tube mounted within the outer casing and spaced therefrom and having a downstream and an upstream end in use thereof, an axially extending dilution air duct which is adapted to be supplied with dilution air, and which extends alongside the flame tube, an axially extending primary combustion air duct for delivering primary combustion air to the upstream end of the flame tube, a plurality of angularly spaced apart nozzle guide vanes having aerofoil surfaces which are mounted within and extend radially completely across the flame tube, a passage within each nozzle guide vane, each said passage communicating with the dilution air duct, and at least one aperture in a said aerofoil surface of each nozzle guide vane, said at least one aperture communicating with the said passage and with the interior of the flame tube upstream of the downstream end thereof, said apertures being such that at least a major portion of the dilution air passes through said apertures to mix with the combustion gases flowing through the flame tube.

4. A gas turbine engine combustion chamber comprising an annular air passage, an outer casing, a single annular flame tube mounted within the outer casing and spaced therefrom and having a downstream and an upstream end in use thereof, an axially extending dilution air duct, a dilution air chute which is adapted to be supplied with dilution air, from the annular air passage the said dilution air duct extending alongside the flame tube, a primary air chute adapted to deliver primary combustion air to the upstream end of the flame tube from the annular air passage, a plurality of angularly spaced apart nozzle guide vanes having aerofoil surfaces which are mounted within and extend radially completely across the flame tube, a passage within each nozzle guide vane, each said passage communicating with the dilution air duct, and at least one aperture in a said aerofoil surface of each nozzle guide vane, said at least one aperture communicating with the said passage and which being spaced from the downstream end thereof of the flame tube, the said primary and dilution air chutes being alternately juxtaposed around the annular air passage, whereby dilution air passes through said apertures in a downstream direction to mix with the combustion gases flowing through the flame tube.

5. A gas turbine engine combustion chamber as claimed in claim 4 in which there are further provided cooling air passages, said cooling air passages surrounding the flame tube on the side thereof remote from the dilution air duct, and cooling air chutes adapted to supply the said cooling air passages with air from the annular air passage, the said cooling air chutes being disposed angularly between the primary air chutes.

6. A gas turbine engine combustion chamber comprising an outer casing, a flame tube mounted within the outer casing and spaced therefrom and having a downstream and an upstream end in use thereof, an axially extending dilution air duct which is adapted to be supplied with dilution air, and which extends alongside the flame tube, an axially extending primary combustion air duct having an entrance into the flame tube at the upstream end thereof through which primary combustion air is delivered to the flame tube, a plurality of angularly spaced apart nozzle guide vanes having aerofoil surfaces which are mounted within and extend radially completely across the flame tube, a passage within each nozzle guide vane, each said passage communicating with the dilution air duct, at least one aperture in a said aerofoil surface of each nozzle guide vane, said at least one aperture communicating with the said passage and being spaced from the downstream end thereof of the flame tube, the arrangement being such that dilution air from the dilution air duct passes through said apertures in a downstream direction to mix with the combustion gases flowing through the flame tube, and a flow directing member provided in the flame tube downstream of the said entrance thereto of the primary combustion air duct, the flow directing member having a curvature such that at least part of the primary combustion air entering the flame tube is directed into a circulatory flow in the flame tube.

7. A gas turbine engine combustion chamber as claimed in claim 6 in which the flame tube is provided at its upstream end, at the said entrance thereto of the primary combustion air duct, with a fuel atomising member, disposed in relation to the said flow directing member so that the circulatory air flow produced thereby impinges on the said fuel atomising member.

8. A gas turbine engine combustion chamber comprising an outer casing, a flame tube having a downstream and an upstream end in use thereof mounted within a flame tube wall mounted within the outer casing, and spaced therefrom, an axially extending dilution air duct which is adapted to be supplied with dilution air, and which extends between the said outer casing and the flame tube wall, an axially extending primary combustion air duct for delivering primary combustion air to the upstream end of the flame tube, a plurality of angularly spaced apart nozzle guide vanes having aerofoil surfaces which are mounted within and extend radially completely across the flame tube, at least one aperture in the flame tube wall angularly between each pair of nozzle guide vanes, each said aperture communicating with the dilution air duct, a passage within each nozzle guide vane, each said passage communicating with the dilution air duct, and at least one aperture in a said aerofoil surface of each nozzle guide vane, said at least one aperture communicating with the said passage and being spaced from the downstream end thereof, the arrangement being such that dilution air from the dilution air duct passes through said apertures in a downstream direction to mix with the combustion gases flowing through the flame tube.

References Cited by the Examiner

UNITED STATES PATENTS

| | | | |
|---|---|---|---|
| 2,489,683 | 11/1949 | Stalker | 253—39.1 |
| 2,625,793 | 1/1953 | Mierley | 253—39.1 |
| 3,045,965 | 7/1962 | Bowmer | 253—39.1 |
| 3,088,281 | 5/1963 | Soltau | 60—39.65 |

MARK NEWMAN, *Primary Examiner.*

RALPH D. BLAKESLEE, *Examiner.*